UNITED STATES PATENT OFFICE.

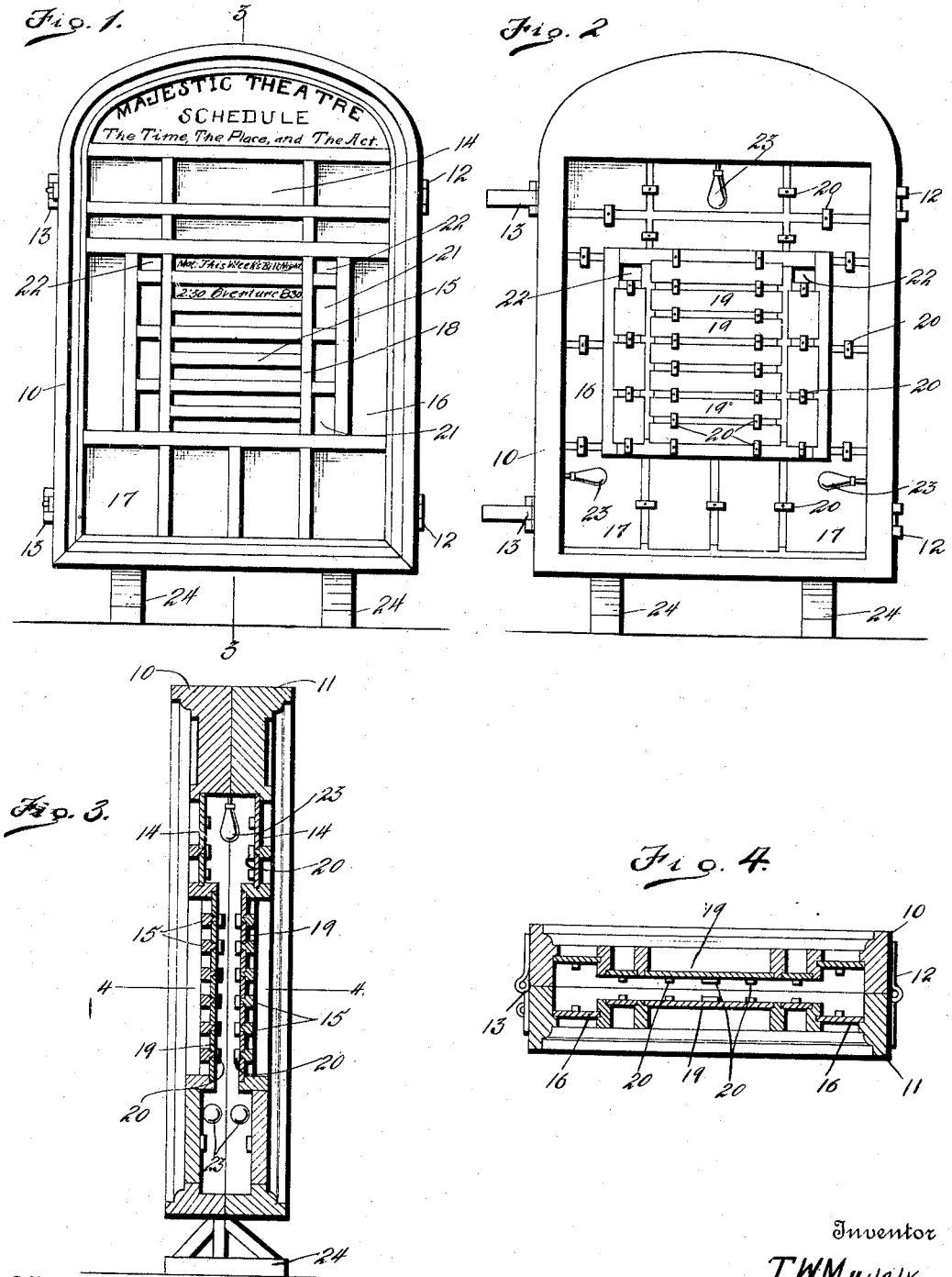

THOMAS W. MULLALY, OF FORT WORTH, TEXAS.

THEATRICAL SCHEDULE AND ADVERTISING CABINET.

1,038,416.　　　Specification of Letters Patent.　　Patented Sept. 10, 1912.

Application filed July 26, 1911. Serial No. 640,562.

*To all whom it may concern:*

Be it known that I, THOMAS W. MULLALY, a citizen of the United States, residing at Fort Worth, in the county of Tarrant and State of Texas, have invented certain new and useful Improvements in Theatrical Schedule and Advertising Cabinets, of which the following is a specification.

This invention relates to improvements in display cabinets, and has particular reference to a bulletin board to be used in announcing to the public the times, the places, and the acts scheduled to take place at theaters or similar places.
The principal object of the invention is to provide a bulletin board which shall contain the names of the number of acts which are to take place at a theater, for instance; a vaudeville program, giving the exact time that each act begins in both the matinée and evening performances, and also the photographs of the different artists. The cabinet may also be used in connection with dramatic performances. These and other objects will be apparent from the following description, and with particular reference to the accompanying drawings, in which:

Figure 1 is a front elevation of a bulletin board made in accordance with my invention. Fig. 2 is a rear elevation of one of the sections of the same. Fig. 3 is a vertical section on the line 3—3 of Fig. 1, Fig. 4 is a transverse section on the line 4—4 of Fig. 3.

Referring particularly to the drawings it will be seen that I have provided a double board formed of the two portions 10 and 11, connected at one vertical edge by means of the hinges 12 and provided with suitable fastening devices 13 to hold the parts 10 and 11 together. Within each of the frames are arranged the divisions 14, 15 and 16 and 17, by means of the molding strips or other suitable division means 18. The division 14 is subdivided so as to contain the name of the theater, and other suitable phraseology desired by the manager of the theater, and also a space at the side for advertising, and in the center for some announcements of special features, either as to the particular acts, or that souvenirs will be given at certain performances.

The central space 15 of the bulletin board is formed into a number of narrow spaces, in which are arranged slides 19, preferably of frosted glass, having thereon the names of the various acts, and at one end of each of the slides is printed the exact time at which such act begins in the matinée performance, and at the opposite end of each of the slides the time at the evening performance. Pivoted buttons 20 are mounted on the partition strips to hold the slides in place. On either side of the section 15 is a vertical line of partitioned spaces 21, for photographs of the artists in the different acts. The spaces 14, 16, and 17 are subdivided into advertisement spaces. At the upper end of each of the photograph spaces 21 is a pocket 22 for programs or other literature desired to be distributed by the house.

Referring particularly to Figs. 3 and 4, the molding strips are arranged in stepped relation, those at the center of the cabinet being the highest and those toward the edges being lower, so that the slides may be readily inserted on each side of the compartments. Within the cabinet and behind the spaces are arranged the electric lamps 23, so that the acts will stand out prominently above the other portions of the board. The board is provided with the feet 24 to hold the same a suitable distance above the pavement or floor and thus protect the cabinet. Both sides of the board are shown in Fig. 1, so that the legends may be read from either side, at night, or in the day time. If desired, I may use one side of the board to show the acts representing "This week's bill," and the opposite side for "Next week's bill."

The sections in the frame of the bulletin board are readily removable, so that the frame may be subdivided in any desired manner, according to the ideas of the management of each theater. It will, of course, be understood that I may make all the slides semitransparent, similar to the act slides, so that all the reading matter on the board will show up brightly at night.

What is claimed is:

A bulletin board comprising large frames hinged together, fastening means for holding the frames together, a small frame disposed in the center of each of said large frames, vertical and horizontal strips within the small frame, semi-transparent removable slides on the horizontal strips, pivoted members on the said strips for holding the slides, vertical and horizontal strips between the large and small frames, semi-transparent slides between the strips, pivoted members for holding the last-named slides, supporting means for the large frames, and a lighting means between the frames whereby the announcements may be read from either side of the board.

In testimony whereof I affix my signature, in the presence of two witnesses.

THOMAS W. MULLALY.

Witnesses:
M. B. LOYD,
T. B. YARBROUGH.